United States Patent
Muldoon (10) Patent No.: US 10,563,591 B2
(45) Date of Patent: Feb. 18, 2020

(54) SYSTEMS AND METHODS OF LOW SPOOL POWER EXTRACTION

(71) Applicant: UNITED TECHNOLOGIES CORPORATION, Farmington, CT (US)

(72) Inventor: Marc J Muldoon, Marlborough, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 173 days.

(21) Appl. No.: 15/873,138

(22) Filed: Jan. 17, 2018

(65) Prior Publication Data
US 2019/0218977 A1 Jul. 18, 2019

(51) Int. Cl.
| F02C 7/32 | (2006.01) |
| F02C 7/36 | (2006.01) |
| F02C 7/268 | (2006.01) |
| F16H 3/089 | (2006.01) |
(Continued)

(52) U.S. Cl.
CPC .............. F02C 7/32 (2013.01); F01D 15/10 (2013.01); F02C 7/268 (2013.01); F02C 7/275 (2013.01); F02C 7/36 (2013.01); F16H 3/089 (2013.01); F05D 2220/32 (2013.01); F05D 2220/76 (2013.01); F05D 2260/40 (2013.01); F05D 2260/4023 (2013.01); F16H 2200/0034 (2013.01)

(58) Field of Classification Search
CPC ............ F02C 7/32; F02C 7/268; F01D 15/10
See application file for complete search history.

(56) References Cited

U.S. PATENT DOCUMENTS

| 7,758,302 B2* | 7/2010 | Linet ................. F02C 7/36 415/124.1 |
| 7,997,085 B2* | 8/2011 | Moniz ............... F01D 15/10 60/778 |

(Continued)

FOREIGN PATENT DOCUMENTS

| FR | 2921423 | 3/2009 |
| FR | 2921423 A1 * | 3/2009 ............... F02C 7/32 |

OTHER PUBLICATIONS

European Patent Office, European Search Report dated Jun. 5, 2019 in Application No. 19151161.7.

*Primary Examiner* — Moshe Wilensky
*Assistant Examiner* — Topaz L. Elliott
(74) *Attorney, Agent, or Firm* — Snell & Wilmer, L.L.P.

(57) ABSTRACT

A power extraction system for a gas turbine engine may comprise a high spool transmission, a low spool transmission, and an accessory gearbox. The accessory gearbox may comprise a starter-generator, a low spool starter-generator gear, a high spool gear, and a clutch configured to selectively engage and disengage the low spool starter-generator gear and the high spool gear. The low spool starter-generator gear may be configured to transfer torque between the starter-generator and the low spool transmission for accessory power generation. The high spool gear may be configured to transfer torque to the high spool transmission for engine starting. The clutch may be controlled by a variable transmission and may allow accessories to be driven by the low spool after starting.

16 Claims, 3 Drawing Sheets

(51) Int. Cl.
   *F01D 15/10*   (2006.01)
   *F02C 7/275*   (2006.01)

(56) References Cited

U.S. PATENT DOCUMENTS

| | | | | |
|---|---|---|---|---|
| 8,015,828 | B2* | 9/2011 | Moniz | F02C 7/275 |
| | | | | 60/778 |
| 8,500,583 | B2* | 8/2013 | Goi | F02C 7/275 |
| | | | | 475/5 |
| 9,200,592 | B2* | 12/2015 | Berryann | F01D 19/00 |
| 2007/0137219 | A1* | 6/2007 | Linet | F02C 3/107 |
| | | | | 60/802 |
| 2009/0064683 | A1* | 3/2009 | Moniz | F02C 7/275 |
| | | | | 60/792 |
| 2011/0101693 | A1* | 5/2011 | Goi | F02C 7/275 |
| | | | | 290/46 |
| 2013/0000317 | A1* | 1/2013 | Berryann | F01D 19/00 |
| | | | | 60/778 |
| 2015/0330300 | A1 | 11/2015 | Suciu et al. | |
| 2016/0177822 | A1* | 6/2016 | Howes | F02C 6/16 |
| | | | | 60/785 |
| 2017/0074169 | A1 | 3/2017 | Waissi et al. | |
| 2017/0190441 | A1 | 7/2017 | Mackin | |
| 2018/0223740 | A1* | 8/2018 | Forest | F02C 7/36 |

\* cited by examiner

SYSTEMS AND METHODS OF LOW SPOOL POWER EXTRACTION

FIELD

The present disclosure relates generally to gas turbine engines and, more specifically, to systems and method for low spool power extraction.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Increasing engine bypass ratios and/or the electrical needs of an aircraft tends to increase demand on the engine's compressor section to perform under increased loading. In this regard, it may be desirable to transfer load from the high spool to the low spool for accessory power generation to reduce idle thrust and core temperatures and/or to decrease fuel consumption. However, the low spool tends to experience a wide range of rotational speeds, which can be problematic for accessories (e.g., generators and/or pumps) that need a relatively constant speed.

SUMMARY

A power extraction system for a gas turbine engine is disclosed herein. In accordance with various embodiments, the power extraction system may comprise a high spool transmission, a low spool transmission, and an accessory gearbox. The accessory gearbox may comprise a starter-generator, a low spool starter-generator gear, a high spool gear, and a clutch. The low spool starter-generator gear may be configured to transfer torque between the starter-generator and the low spool transmission. The high spool gear may be configured to transfer torque to the high spool transmission. The clutch may be configured to selectively engage and disengage the low spool starter-generator gear and the high spool gear.

In various embodiments, the accessory gearbox may further comprise a variable speed transmission coupled between the low spool transmission and the low spool starter-generator gear. The variable speed transmission may be configured to actuate the clutch.

In various embodiments, a controller may be in operable communication with the variable speed transmission. A sensor may be configured to output data to the controller.

In various embodiments, the starter-generator may be configured to drive the high spool transmission when the clutch engages the low spool starter-generator gear and the high spool gear.

In various embodiments, the accessory gearbox may further comprise a plurality of intermeshed gears. A first gear of the plurality of intermeshed gears may be coupled to the low spool starter-generator gear. A rotation of the first gear may be independent from a rotation of the high spool gear when the clutch is disengaged from the high spool gear.

A gas turbine engine is also disclosed herein. In accordance with various, the gas turbine engine may comprise a high spool mechanically coupled to a high spool transmission, a low spool mechanically coupled to a low spool transmission, and an accessory gearbox. The accessory gearbox may comprise a low spool starter-generator gear, a high spool gear, and a clutch configured to engage and disengage the low spool starter-generator gear and the high spool gear. The low spool transmission may be configured to transfer torque between the low spool starter-generator gear and the low spool. The high spool transmission may be configured to transfer torque between the high spool gear and the high spool.

In various embodiments, the accessory gearbox may further comprise a variable speed transmission coupled between the low spool starter-generator gear and the low spool transmission. The variable speed transmission may be configured to actuate the clutch.

In various embodiments, the accessory gearbox may further comprise a plurality of intermeshed gears coupled to the low spool starter-generator gear. A starter-generator may be coupled to a first gear of the plurality of intermeshed gears. The starter-generator may be configured to drive the high spool when the clutch is engaged with the low spool starter-generator gear and the high spool gear.

In various embodiments, the accessory gearbox may further comprise a gearbox accessory coupled to a second gear of the plurality of intermeshed gears. The first gear and the second gear may rotate independently of the high spool gear when the clutch is disengaged from the low spool starter-generator gear and the high spool gear. The gearbox accessory may comprise at least one of a deoiler, a hydraulic pump, an oil pump, or a fuel pump.

In various embodiments, a sensor may be configured to detect an operating condition of the gas turbine engine. The sensor may be configured to output data related to the operating condition of the gas turbine engine to a controller that is in operable communication with the clutch.

A method of forming a low spool power extraction system in a gas turbine engine is also disclosed herein. In accordance with various embodiments, the method may comprise coupling a high spool of the gas turbine engine to a high spool transmission, coupling a low spool of the gas turbine engine to a low spool transmission, coupling a variable speed transmission between the low spool transmission and a low spool starter-generator gear located within an accessory gearbox of the gas turbine engine, and configuring a clutch to engage and disengage the low spool starter-generator gear and a high spool gear. The high spool gear may be configured to translate torque to the high spool transmission.

In various embodiments, the method may further comprise coupling a plurality of intermeshed gears to the low spool starter-generator gear, coupling a starter-generator to a first gear of the plurality of intermeshed gears, and coupling a gearbox accessory to a second gear of the plurality of intermeshed gears.

In various embodiments, the method may further comprise configuring the plurality of intermeshed gears to rotate independently of the high spool gear when the clutch is disengaged from the high spool gear. The method may further comprise configuring the starter-generator to drive the high spool of the gas turbine engine when the clutch is engaged to the high spool gear.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE D WINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Power extraction systems of the present disclosure may include a low spool transmission configured to transfer torque between a low spool of a gas turbine engine and a starter-generator, which may be connected to an accessory gear box of the gas turbine engine. As used herein, a "starter-generator" refers to a component that is capable of functioning as a starter to initially start the gas turbine engine and as a generator to drive electrical components of the gas turbine engine and/or of the aircraft, after the gas turbine engine has reached a self-sustaining speed. In various embodiments, the power extraction system also includes a clutch configured to connect the starter-generator to a high spool transmission during a starting of the gas turbine engine and then disengage the high spool transmission during normal operation, such that the starter-generator and other gears within the accessory gear box are driven solely by the low spool during normal operation.

Figure 1:
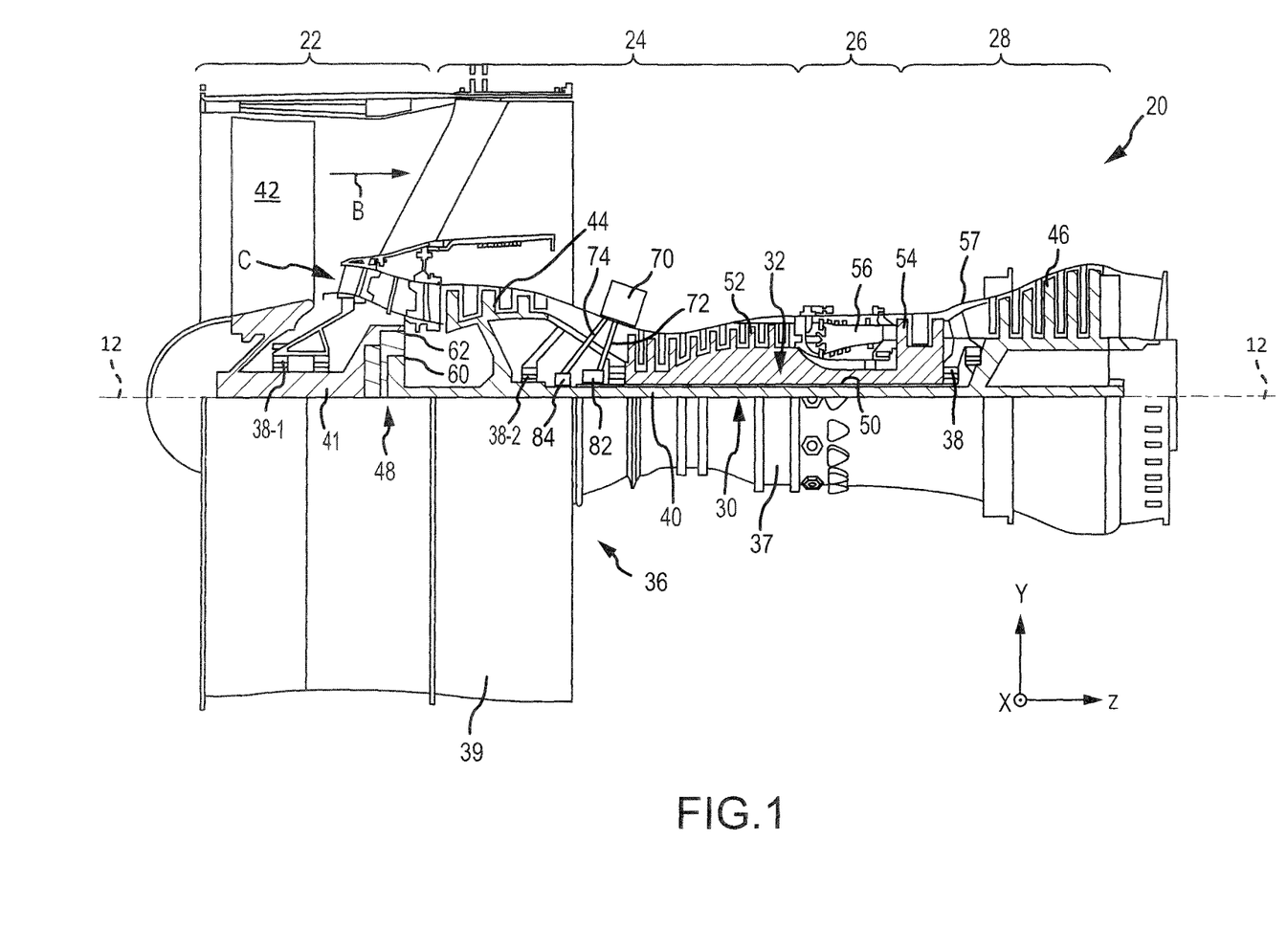
FIG. 1 illustrates a cross-section view of an exemplary gas turbine engine, in accordance with various embodiments.

With reference to FIG. 1, a side cutaway illustration of a gas turbine engine 20 is shown accordance with various embodiments. Gas turbine engine 20 may be a two-spool turbofan that generally incorporates a fan section 22, a compressor section 24, a combustor section 26, and a turbine section 28. Alternative engines may include, for example, an augmentor section among other systems or features. In operation, fan section 22 can drive fluid (e.g., air) along a path of bypass airflow B while compressor section 24 can drive fluid along a path of core airflow C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

Fan section 22, compressor section 24, combustor section 26, and turbine section 28 are arranged sequentially along an engine central longitudinal axis 12. Engine central longitudinal axis 12 is oriented in the z direction on the provided x-y-z axes. Fan section 22, compressor section 24, combustor section 26, and turbine section 28 are arranged within an engine case or static structure 36. Engine case 36 includes an inner case 37 (e.g., a core case) and an outer case 39 (e.g., a fan case). The inner case 37 may house at least one or more of compressor section 24, combustor section 26, and turbine section 28; e.g., an engine core. The outer case 39 may house at least the fan section 22.

Gas turbine engine 20 may generally comprise a low spool 30 and a high spool 32 mounted for rotation about engine central longitudinal axis 12 via several bearing systems 38, 38-1, and 38-2. It should be understood that various bearing systems 38 at various locations may alternatively or additionally be provided, including for example, bearing system 38, bearing system 38-1, and bearing system 38-2.

Low spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than inner shaft 40. Geared architecture 48 may comprise a gear assembly 60 enclosed within a gear housing 62. Gear assembly 60 couples inner shaft 40 to a rotating fan structure; e.g., fan shaft 41.

High spool 32 may comprise an outer shaft 50 that interconnects a high pressure compressor 52 and a high pressure turbine 54. A combustor 56 may be located between high pressure compressor 52 and high pressure turbine 54. A mid-turbine frame 57 of engine case 36 may be located generally between high pressure turbine 54 and low pressure turbine 46. Mid-turbine frame 57 may support one or more bearing systems 38 in turbine section 28. Inner shaft 40 and outer shaft 50 may be concentric and may rotate via bearing systems 38 about the engine central longitudinal axis 12, which is collinear with their longitudinal axes. As used herein, a "high pressure" compressor or turbine experiences a higher pressure than a corresponding "low pressure" compressor or turbine.

The core airflow C may be compressed by low pressure compressor 44 and high pressure compressor 52, mixed and burned with fuel in combustor 56, then expanded over high pressure turbine 54 and low pressure turbine 46. Turbines 46, 54 rotationally drive the respective low spool 30 and high spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of fan 42 may be significantly larger than that of low pressure compressor 44, and low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, or may comprise any gas turbine engine as desired.

Gas turbine engine 20 may also include an accessory gearbox 70, a high spool transmission 72, and a low spool transmission 74. Accessory gearbox 70 may be mounted to the inner case 37. However, in various embodiments, accessory gearbox 70 may be mounted elsewhere with gas turbine engine 20; e.g., to the outer case 39. Accessory gearbox 70 may be configured to transfer rotational energy (e.g., torque) between high spool transmission 72 and/or low spool transmission 74 and one or more components coupled to accessory gearbox 70, as discussed in further detail below.

High spool transmission 72 may be configured to mechanically couple and thereby transfer rotational energy (e.g., torque) between outer shaft 50 of high spool 32 and one or more components of accessory gearbox 70. Low spool transmission 74 may be configured to mechanically couple and thereby transfer rotational energy (e.g., torque) between inner shaft 40 of low spool 30 and one or more components of accessory gearbox 70.

Figure 2A:
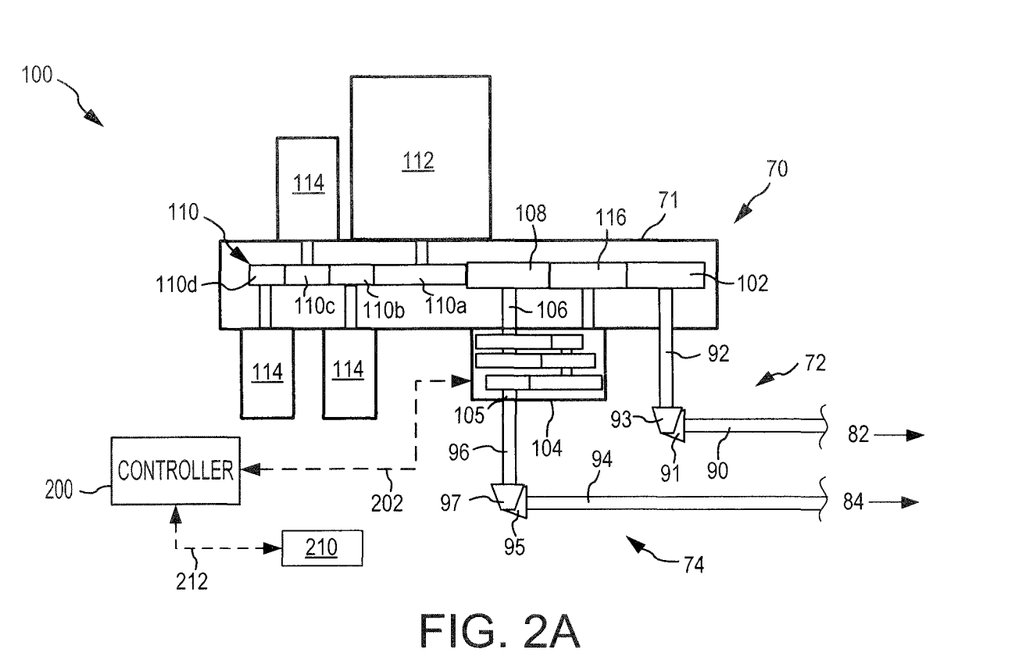
FIG. 2A illustrates a schematic of a power extraction system for a gas turbine engine with a clutch engaged with a low spool starter-generator gear and a high spool gear, in accordance with various embodiments.
Figure 2B:
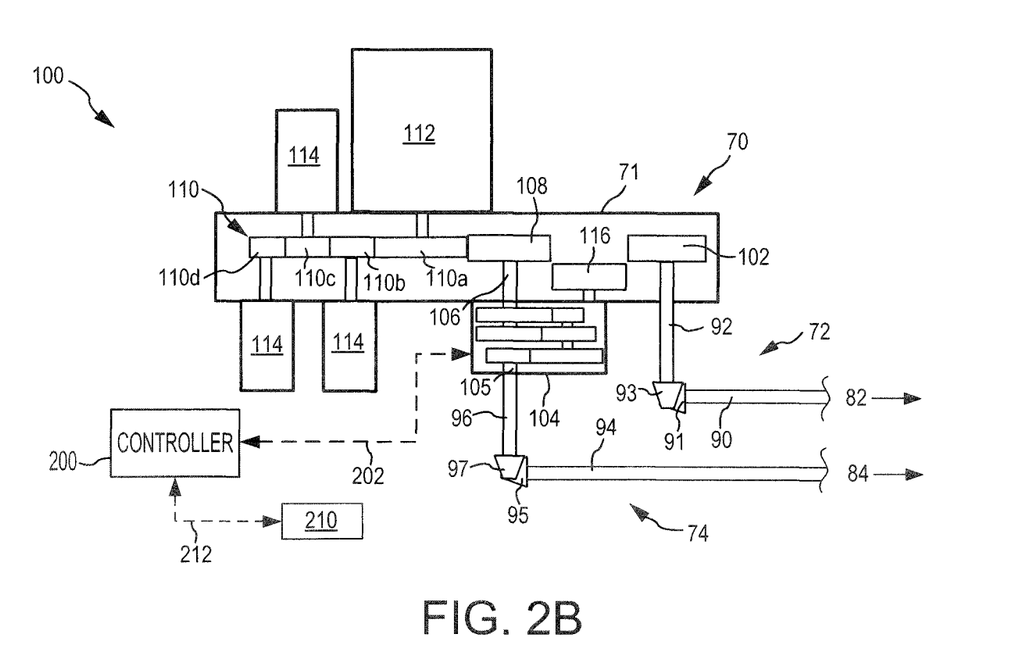
FIG. 2B illustrates a schematic of the power extraction system of FIG. 2A with the clutch disengaged from the low spool starter-generator gear and high spool gears, in accordance with various embodiments.

FIGS. 2A and 2B illustrate a power extraction system 100 for a gas turbine engine, in accordance with various embodiments. Power extraction system 100 may comprise high spool transmission 72, low spool transmission 74, and one or more components of accessory gearbox 70.

In various embodiments, with combined reference to FIG. 1 and FIGS. 2A and 2B, high spool transmission 72 may comprise a high tower shaft 90 and a high lay shaft 92. Low spool transmission 74 may comprise a low tower shaft 94 and a low lay shaft 96. High tower shaft 90 may extend between outer shaft 50 and high lay shaft 92. Low tower shaft 94 may extend between inner shaft 40 and low lay shaft 96. In particular, a first end of high tower shaft 90 may be mechanically coupled to a geared system 82 configured to transfer torque between high tower shaft 90 and outer shaft 50. A second end of high tower shaft 90 may be mechanically coupled to a gear 91. Stated differently, gear 91 may be mounted to the high tower shaft 90, for example, by splined interface. Gear 91 may engage (e.g., may be meshed with) a gear 93 mounted, for example, by splined interface, to a first end of high lay shaft 92. A second end of high lay shaft 92 may be mechanically coupled to a high spool gear 102 located within a housing 71 of accessory gearbox 70. Stated differently, high spool gear 102 may be mounted to high lay shaft 92, for example, by splined interface. In this regard, high spool transmission 72 is configured to transfer torque between high spool gear 102 and one or more components of high spool 32 (e.g., outer shaft 50 and high pressure turbine 54).

A first end of low tower shaft 94 may be mechanically coupled to a geared system 84 configured to transfer torque between low tower shaft 94 and inner shaft 40. A second end of low tower shaft 94 may be mechanically coupled to a gear 95. Stated differently, gear 95 may be mounted to low tower shaft 94, for example, by splined interface. Gear 95 may engage (e.g., may be meshed with) a gear 97 mounted, for example, by splined interface, to a first end of low lay shaft 96.

A second end of low lay shaft 96 may be connected to a variable speed transmission 104 of accessory gearbox 70. In this regard, low lay shaft 96 may form an input 105 of variable speed transmission 104. An output 106 of variable speed transmission 104 may be mechanically coupled to a low spool starter-generator gear 108 located within accessory gearbox housing 71. Stated differently, low spool starter-generator gear 108 may be mounted to output 106 (e.g., an output shaft) of variable speed transmission 104, for example, by splined interface. Low spool transmission 74 and variable speed transmission 104 may be configured to transfer torque between low spool starter-generator gear 108 and low spool 30.

The rotational speed of inner shaft 40 and thus the rotational speed of low spool transmission 74 may vary over a large range of speeds during operation of gas turbine engine 20. For example, the rotational speed of lower lay shaft 96 may range from between approximately 20% and 100% of a maximum rotation speed experienced during take-off. As used in this context only, "approximately" means ±5%. Variable speed transmission 104 may comprise gears of varying gear ratios. In this regard, variable speed transmission 104 may be configured to adjust its gear ratio in response to an increase or decrease in the rotation speed of lower lay shaft 96, thereby keeping the rotational speed of output 106 at a generally constant speed. As used herein only, a "generally constant speed" means ±10% variation in rotation speed.

Accessory gearbox 70 may comprise an accessory drivetrain 110 having a plurality of intermeshed gears, for example, gears 110a, 110b, 110c, and 110d, coupled to and/or meshed with low spool starter-generator gear 108. In this regard, torque may be transferred between low spool starter-generator gear 108 and the intermeshed gears of accessory drivetrain 110. The gears of accessory drivetrain 110 may be configured to drive one or more components of accessory gearbox 70. For example, accessory gearbox 70 may comprise one or more gearbox accessories 114 coupled to the gears (e.g., gears 110b, 110c, and 110c) of accessory drivetrain 110. Examples of gearbox accessories include, but are not limited to, a fuel pump, a hydraulic pump, a lubrication pump, an oil pump, and a deoiler. While three gearbox accessories 114 are shown coupled to accessory drivetrain 110, it should be understood that any number of gearbox accessories may be coupled to and driven by accessory drivetrain 110.

In various embodiments, accessory gearbox 70 includes a starter-generator 112. Starter-generator 112 may be coupled to a gear of accessory drivetrain 110 (e.g., gear 110a). When in "starting mode," starter-generator 112 may operate as a starter motor to drive high spool 32. When in "generator mode," starter-generator 112 may operate as a generator driven by low spool 30.

Accessory gearbox 70 may comprise a clutch 116 located between low spool starter-generator gear 108 and high spool gear 102. Clutch 116 may be configured to selectively engage and disengage from low spool starter-generator gear 108 and high spool gear 102. In this regard, when clutch 116 engages low spool starter-generator gear 108 and high spool gear 102, torque is transferred between low spool starter-generator gear 108 and high spool gear 102. When clutch 116 is disengaged from low spool starter-generator gear 108 and high spool gear 102, low spool starter-generator gear 108 and accessory drivetrain 110 rotate independently of high spool gear 102. In various embodiments, actuation of clutch 116 may be controlled by variable speed transmission 104. Stated differently, variable speed transmission 104 may be configured to translate clutch 116 from an engaged position (FIG. 2A) to a disengaged position (FIG. 2B).

When clutch 116 is engaged with low spool starter-generator gear 108 and high spool gear 102, starter-generator 112 drives rotation of low spool starter-generator gear 108, which in turn drives rotation of high spool 32 via high spool gear 102 and high spool transmission 72. When high spool 32 reaches a suitable rotational speed, fuel is sent to combustor 56 and ignited. Clutch 116 may then disengage high spool gear 102 and/or low spool starter-generator gear 108 such that high spool 32 can rotate independently from low spool 30 and from the turbine engine accessories driven by accessory drivetrain 110 (e.g., starter-generator 112 and gearbox accessories 114). In various embodiments, after clutch 116 disengages high spool gear 102, starter-generator 112 and each of the gearbox accessories 114 are driven solely by low spool 30. In various embodiments, low spool starter-generator gear 108 is configured to transfer torque between low spool transmission 74 and starter-generator 112 when starter-generator 112 is in generator mode (i.e., clutch 116 is disengaged from high spool gear 102 when starter-generator 112 is in generator mode). High spool gear 102 is configured to transfer torque to high spool transmission 72 when starter-generator 112 is in starting mode (i.e., clutch 116 is engaged with low spool starter-generator gear 108 and high spool gear 102 when starter-generator 112 is in starting mode).

Power extraction system 100 may further comprise a controller 200 and one or more sensor(s) 210 configured to output data, related to an operational condition of gas turbine engine 20, to controller 200. Controller 200 may be in operable communication with variable speed transmission 104. In this regard, controller 200 may be in communication with variable speed transmission 104 via a link 202. In various embodiments, link 202 may represent a wired communication, a wireless communication, a mechanical communication (i.e., a shaft, rod, lever, conduit, wire, etc.) or any other link for operatively coupling variable speed transmission 104 with controller 200. In various embodiments, controller 200 may comprise a full authority digital engine control (FADEC) system. Controller 200 may be positioned on the aircraft and may control operation of variable speed transmission 104 based on data received from sensor(s) 210. Sensor(s) 210 may be configured to detect parameters related to an operating condition of gas turbine engine 20. For example, sensor(s) 210 may detect a rotational speed of a portion of gas turbine engine 20, a temperature of a portion of the gas turbine engine 20, a pressure within a portion of the gas turbine engine 20, a thrust ratio of the gas turbine engine 20, an air flow ratio of the gas turbine engine 20, a flow parameter at a given station of the gas turbine engine 20, or the like. Sensor(s) 210 may be in communication with controller 200 via a link 212. In various embodiments, link 212 may represent a wired communication, a wireless communication, a mechanical communication (i.e., a shaft, rod, lever, conduit, wire, etc.) or any other link for operatively coupling sensor(s) 210 with controller 200.

Controller 200 may provide control signals to various elements of variable speed transmission 104. For example, in response to data output from sensor(s) 210, controller 200 may send various control signals to variable speed transmission 104. In various embodiments, the control signal may cause an actuation of a transmission actuator that changes the gear ratios of variable speed transmission 104. Controller 200 may be configured to adjust the gear ratios of variable speed transmission 104 such that output 106 and the gears mounted thereto (e.g., low spool starter-generator gear 108) rotate at a generally constant speed. As used herein, a "generally constant speed" means ±10% variation in rotational speed. Stated differently, variable speed transmission 104 is configured to decrease a range of the speeds experienced by the gears connected to output 106 of variable speed transmission 104.

In various embodiments, controller 200 may be configured to send a control signal that causes variable speed transmission 104 to actuate clutch 116, and thereby cause clutch 116 to either engage (FIG. 2A) or disengage (FIG. 2B) from low spool starter-generator gear 108 and high spool gear 102. For example, in response to data from sensor 210 that indicates an ignition within combustor 56 or a particular rotation speed of high pressure turbine 54 or hub tower shaft 90, controller 200 may send a control signal to variable speed transmission 104, which causes clutch 116 to disengage from low spool starter-generator gear 108 and/or high spool gear 102, thereby allowing low spool starter-generator gear 108 and accessory drivetrain 110 to rotate independently of high spool gear 102 and high spool 32.

Controller 200 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

Controller 200 may comprise system program instructions and/or controller instructions that may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 3:
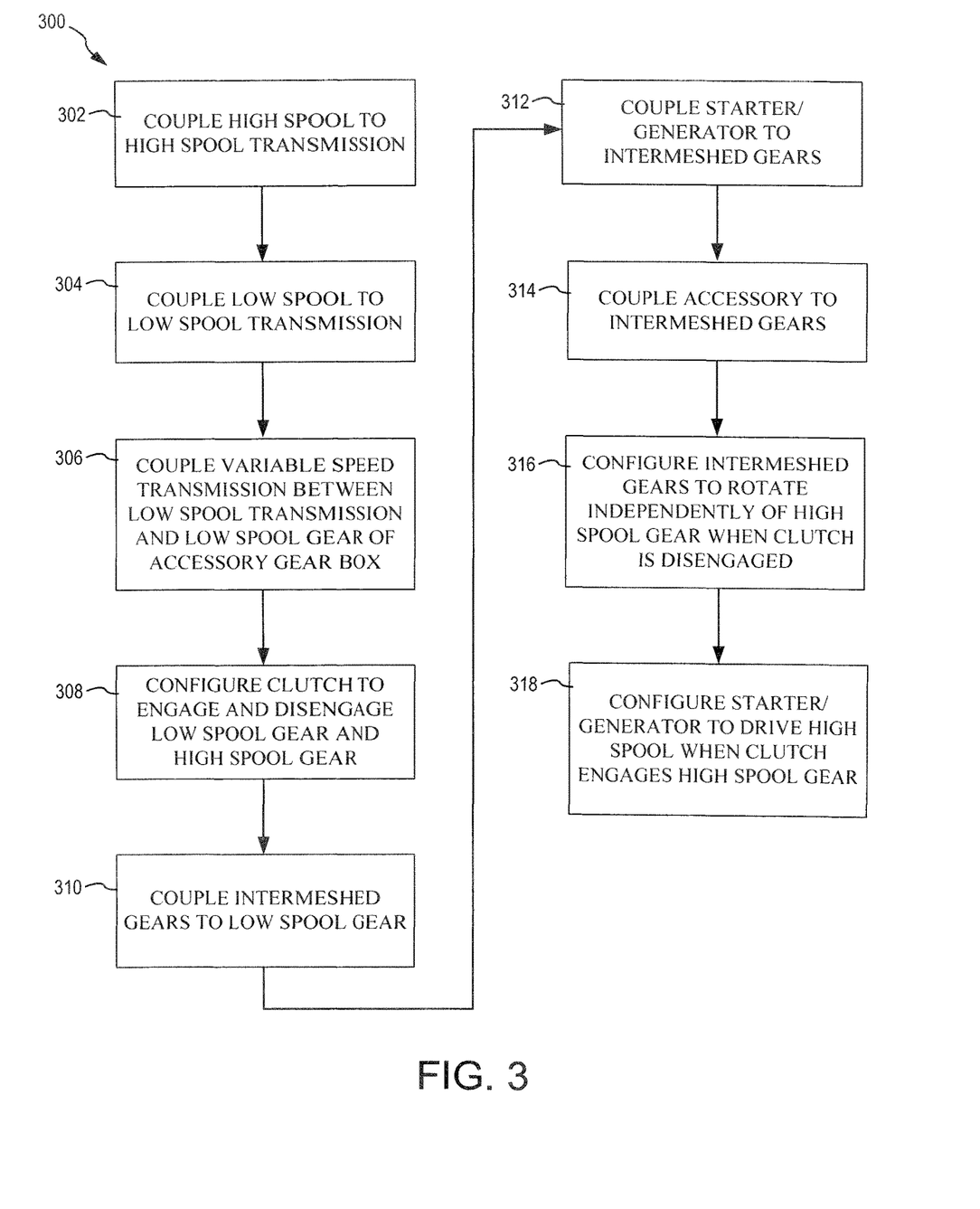
FIG. 3 illustrates a method of forming a low spool power extraction system in a gas turbine engine, in accordance with various embodiments.

With reference to FIG. 3, a method 300 of forming a low spool power extraction system in a gas turbine engine is illustrated, in accordance with various embodiments. Method 300 may comprise coupling a high spool of the gas turbine engine to a high spool transmission (step 302), coupling a low spool of the gas turbine engine to a low spool transmission (step 304), coupling a variable speed transmission between the low spool transmission and a low spool starter-generator gear located within an accessory gear box of the gas turbine engine (step 306), and configuring a clutch to engage and disengage the low spool starter-generator gear and a high spool gear configured to translate torque to the high spool transmission (step 308).

In various embodiments, method 300 may further comprise coupling a plurality of intermeshed gears to the low spool starter-generator gear (step 310), coupling a starter-generator to a first gear of the plurality of intermeshed gears (step 312), and coupling a gearbox accessory to a second gear of the plurality of intermeshed gears (step 314).

In various embodiments, method 300 may further comprise configuring the plurality of inter meshed gears to rotate independently of the high spool gear when the clutch is disengaged from the high spool gear (step 316). In various embodiments, method 300 may further comprise configuring the starter-generator to drive the high spool of the gas turbine engine when the clutch is engaged to the high spool gear (step 318).

With combined reference to FIG. 1, FIGS. 2A and 2B, and FIG. 3, step 302 of may comprise coupling high spool 32 of gas turbine engine 20 to high spool transmission 72. Step 304 may comprise coupling low spool 30 of gas turbine engine 20 to low spool transmission 74. Step 306 may comprise coupling variable speed transmission 104 between low spool transmission 74 and low spool starter-generator gear 108 located within accessory gearbox 70. Step 308 may comprise configuring clutch 116 to engage and disengage low spool starter-generator gear 108 and high spool gear 102, where high spool gear 102 is configured to translate torque to high spool transmission 72.

Step 310 of method 300 may comprise coupling a plurality of intermeshed gears 110a, 110b, 110c, and 110d to low spool starter-generator gear 108. Step 312 may comprise coupling starter-generator 112 to a first gear 110a of the plurality of intermeshed gears. Step 314 may comprise coupling a gearbox accessory 114 to a second gear 110b of the plurality of intermeshed gears. Step 316 of method 300 may comprise configuring the plurality of intermeshed gears 110a, 110b, 110c, and 110d to rotate independently of high spool gear 102 when clutch 116 is disengaged from high spool gear 102. Step 318 may comprise configuring starter-generator 112 to drive high spool 32 of gas turbine engine 20 when clutch 116 is engaged to high spool gear 102.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power extraction system for a gas turbine engine, comprising:
   a high spool transmission;
   a low spool transmission; and
   an accessory gearbox comprising:
      a starter-generator,
      a low spool starter-generator gear configured to transfer torque between the starter-generator and the low spool transmission,
      a high spool gear configured to transfer torque to the high spool transmission,
      a clutch configured to selectively engage and disengage the low spool starter-generator gear and the high spool gear, and
      a variable speed transmission coupled between the low spool transmission and the low spool starter-generator gear, wherein the variable speed transmission is configured to actuate the clutch.

2. The power extraction system of claim 1, further comprising:
a controller in operable communication with the variable speed transmission; and
a sensor configured to output data to the controller.

3. The power extraction system of claim 1, wherein the starter-generator is configured to drive the high spool transmission when the clutch engages the low spool starter-generator gear and the high spool gear.

4. The power extraction system of claim 1, wherein the accessory gearbox further comprises a plurality of intermeshed gears coupled to the low spool starter-generator gear, wherein a first gear of the plurality of intermeshed gears is coupled to the starter-generator.

5. The power extraction system of claim 4, wherein a rotation of the first gear is independent from a rotation of the high spool gear when the clutch is disengaged from the low spool starter-generator gear and the high spool gear.

6. A gas turbine engine, comprising:
a high spool mechanically coupled to a high spool transmission;
a low spool mechanically coupled to a low spool transmission; and
an accessory gearbox comprising:
a low spool starter-generator gear, wherein the low spool transmission is configured to transfer torque between the low spool starter-generator gear and the low spool,
a high spool gear, wherein the high spool transmission is configured to transfer torque between the high spool gear and the high spool,
a clutch configured to engage and disengage the low spool starter-generator gear and the high spool gear, and
a variable speed transmission coupled between the low spool starter-generator gear and the low spool transmission, wherein the variable speed transmission is configured to actuate the clutch.

7. The gas turbine engine of claim 6, wherein the accessory gearbox further comprises:
a plurality of intermeshed gears coupled to the low spool starter-generator gear; and
a starter-generator coupled to a first gear of the plurality of intermeshed gears.

8. The gas turbine engine of claim 7, wherein the starter-generator is configured to drive the high spool when the clutch is engaged with the low spool starter-generator gear and the high spool gear.

9. The gas turbine engine of claim 7, wherein the accessory gearbox further comprises a gearbox accessory coupled to a second gear of the plurality of intermeshed gears.

10. The gas turbine engine of claim 9, wherein the first gear and the second gear rotate independently of the high spool gear when the clutch is disengaged from the low spool starter-generator gear and the high spool gear.

11. The gas turbine engine of claim 10, wherein the gearbox accessory comprises at least one of a deoiler, a hydraulic pump, an oil pump, or a fuel pump.

12. The gas turbine engine of claim 10, further comprising:
a sensor configured to detect an operating condition of the gas turbine engine; and
a controller in operable communication with the clutch, wherein the sensor is configured to output data related to the operating condition of the gas turbine engine to the controller.

13. A method of forming a low spool power extraction system in a gas turbine engine, comprising:
coupling a high spool of the gas turbine engine to a high spool transmission;
coupling a low spool of the gas turbine engine to a low spool transmission;
coupling a variable speed transmission between the low spool transmission and a low spool starter-generator gear located within an accessory gearbox of the gas turbine engine; and
configuring a clutch to engage and disengage the low spool starter-generator gear and a high spool gear, wherein the high spool gear is configured to transmit torque to the high spool transmission, and wherein the variable speed transmission is configured to actuate the clutch.

14. The method of claim 13, further comprising:
coupling a plurality of intermeshed gears to the low spool starter-generator gear;
coupling a starter-generator to a first gear of the plurality of intermeshed gears; and
coupling a gearbox accessory to a second gear of the plurality of intermeshed gears.

15. The method of claim 14, further comprising configuring the plurality of intermeshed gears to rotate independently of the high spool gear when the clutch is disengaged from the high spool gear.

16. The method of claim 15, further comprising configuring the starter-generator to drive the high spool of the gas turbine engine when the clutch is engaged to the high spool gear.

* * * * *